Patented Feb. 23, 1954

2,670,377

UNITED STATES PATENT OFFICE 2,670,377

REDUCTION OF ALKYL NITROAROMATIC COMPOUNDS

Ralph B. Thompson, Hinsdale, Ill., assignor to Universal Oil Products Company, Chicago, Ill., a corporation of Delaware No Drawing. Application August 30, 1951, Serial No. 244,463

11 Claims. (Cl. 260—580)

This invention relates to a continuous process for reduction of certain alkyl nitroaromatic compounds to form the corresponding amino-substituted alkylaryl derivatives, the latter having utility as intermediates in the production of a specific class of oxidation inhibitors for organic compounds and as fuel oil additives in which the additive has the capacity to reduce or eliminate the tendency of the fuel oil to undergo storage deterioration. More specifically, the invention concerns a process for effecting hydrogenation of the indicated class of nitro compounds in the presence of a particular mixture of solvents which enables the process to be operated on a continuous basis accompanied by high yields of the desired amino product.

It is one object of the present invention to provide a process for the catalytic reduction of a nitroaromatic compound whereby the reduction may be effected continuously with an accompanying high yield of conversion product. Another object of the invention is to provide a solvent for alkyl nitroaromatic compounds which maintains the compound and its reduction product in homogeneous solution during the reductive hydrogenation thereof and which readily yields the amine reduction product of the reaction upon attempted recovery of the latter from the reaction mixture and catalyst.

In one of its embodiments the present invention concerns a process for selectively reducing the nitro group of an alkyl nitroaromatic compound to its corresponding amino-substituted analog which comprises hydrogenating an alkyl nitroaromatic compound dissolved in a solvent comprising a paraffinic hydrocarbon which is liquid at the ambient pressure and temperature conditions and an alcohol selected from methanol and ethanol in the presence of hydrogen and a metallic hydrogenation catalyst at hydrogenation reaction conditions.

A more specific embodiment of the invention concerns a process for reducing the nitro group of an alkyl nitrobenzene in which the alkyl substituent contains at least 7 carbon atoms per alkyl group to the corresponding alkyl aminobenzene which comprises passing said alkyl nitrobenzene contained in a liquid solvent comprising a mixture of from about 10 to about 50% by weight of methanol and a $C_6$ paraffinic hydrocarbon over a supported metallic hydrogenation catalyst at hydrogenating reaction conditions.

Other objects and embodiments of the invention relating to specific aspects thereof will be referred to in greater detail in the following further description of the invention.

Certain members of the series of compounds characterized as alkyl aromatic amines, diamines and N-alkyl aromatic mono- and polyamines are uniquely useful as intermediates in the manufacture of oxidation inhibitors, compounds characterized as being effective in relatively small concentrations to inhibit oxidative deterioration of organic compounds and to reduce or eliminate the tendency of oils, particularly petroleum-derived fuel oils, to undergo certain types of deterioration, such as sludge formation, discoloration, etc., which occurs upon storage of such oils.

The additives are prepared from such amines as intermediates by conversion to their N-alkyl substituted derivatives, by conversion to their hydroxy-substituted derivatives, by conversion to their guanidine and biguanide derivatives, etc. The resulting products are customarily employed as additives to organic compositions subject to undesirable changes due to oxidation and/or storage to thereby reduce the economic loss occasioned by such deterioration. The present amines are also useful as intermediates in the preparation of pharmaceuticals, insecticides, detergents, and for many other uses which will readily be recognized by those skilled in these arts. Commonly recognized practice in the synthesis of these compounds is to utilize alkyl aromatic amines as starting materials, into the molecular structure of which are introduced the substituent radicals, if any, essential for obtaining the final product having the selective property desired. One of the specific problems associated with the initial synthesis of the alkyl aromatic amine by reduction of the corresponding alkyl nitroaromatic compound is the problem of finding a suitable solvent in which the nitro compound is soluble and which does not interfere with the consummate reduction of the nitro group with hydrogen. Although individual solvents are known which dissolve completely the alkyl nitroaromatic compound, such as a liquid aliphatic hydrocarbon, the solvent may otherwise be unsuitable for this purpose because of the resistance of the nitro group to undergo reduction when dissolved in such a solvent, or because the reduction effected in such a solvent proceeds slowly, necessitating extended periods of reaction and eventual separation of amine product from unreduced alkyl nitroaromatic feed stock by distillation or other means. Of the organic compounds commonly utilized as solvents, such as the ketones, alcohols, esters, etc., it has been observed that the relatively high molecular weight alcohols containing more than about 3 carbon atoms per molecule readily dissolve the charging stock, but such solvents are similar to the paraffinic hydrocarbons in that the nitro group of the starting material undergoes slow or incomplete reduction, resulting in a poor yield of the desired amino product, even after prolonged contact of the charging stock with the catalyst in the presence of hydrogen. In some cases the nitro group fails to undergo hydrogenation in the presence of such relatively high molecular weight alcohols except at considerably higher reaction temperatures and at such temperature levels, a large proportion of the amine product is converted to undesirable tars, sludges and other degradation products. The low molecular weight alcohols, such as methanol and ethanol, on the other hand, do not dissolve the charging stock in sufficient concentration to provide a single-phase solution in the concentration required for continuous operation and are generally unsuitable as solvents for the reduction process. It has been discovered that a combination of at least two solvents comprising a mixture of the types referred to as liquid paraffinic hydrocarbons and low molecular weight alcohols, specifically, methanol and ethanol, preferably in mixtures in which the alcohol is present to the extent of from about 10 to about 50% by weight of the mixture, results in a single-phase solution of the charging stock and provides a satisfactory solvent in which the hydrogenation or reduction of the alkyl nitroaromatic compound to the corresponding amine proceeds substantially to completion and results in a high yield of the product within a reaction time suitable for continuous operation of the reduction process.

Suitable alkyl nitroaromatic compounds utilizable as initial charging stocks in the present reduction process may be characterized as members of either the mononuclear class of aromatics (that is, the benzenoid series) or the polycyclic aromatic compounds containing at least one alkyl substituent having at least 7 carbon atoms per alkyl group in the benzenoid series of compounds and at least 1 alkyl group of at least 4 carbon atoms in chain length in the polycyclic aromatic series. The nitro compounds suitable as charging stocks herein may contain one or more nitro substituents and may be additionally substituted by such groups as hydroxy, alkoxy, acyloxy, halogen, sulfo or other non-interfering substituents which are not in themselves independently capable of reduction by hydrogen under the conditions employed in the present process or which do not interfere with the reducing capacity of the present metallic hydrogenation catalyst. The aromatic nucleus of the charging stock may additionally contain other alkyl groups of any desired chain length or aryl, cycloalkyl, aralkyl substituents, provided such additional radicals do not result in hindrance of the nitro group undergoing reductive hydrogenation. Typical alkyl aromatic nitro compounds utilizable as charging stocks in the present process include such representative compounds as ortho-, meta-, para-heptyl nitrobenzene, 4-nitro-2-octyl toluene, 4-nitro-dodecylbenzene, 4,7-dinitro-3-butyl naphthalene, 4,4'-dinitro-3-decyldiphenyl, 3,5-dichloro-4-nitrohexadecylbenzene, and other compounds within the general qualifications hereinabove specified. The products formed by the reduction are named according to the amine corresponding thereto; for example, dodecylnitrobenzene, on reduction in accordance with the present process, produces dodecylaniline. The compounds containing a benzenoid aromatic nucleus are particularly adapted to use in the present process as charging stocks therein for the ultimate production of inhibitors and additives, although the process is not necessarily limited thereto.

The mixture of liquids comprising the selective solvent for the alkyl nitroaromatic compound charged into the hydrogenation reaction of the present process comprises a combination of methanol or ethanol with a liquid paraffinic hydrocarbon containing at least 4 carbon atoms per molecule of either aliphatic or cyclic paraffinic structure. The preferred paraffinic solvents for this purpose are the paraffins of intermediate molecular weight containing from about 5 to about 8 carbon atoms per molecule, such as hexane, cyclohexane, pentane, n-heptane, and mixtures thereof, such as a $C_5$ fraction of a natural gasoline containing various pentane, hexane, heptane and octane isomers. The hydrocarbon portion of the solvent may also contain minor amounts of olefinic and/or cycloolefinic hydrocarbons which are ordinarily hydrogenated under the present conditions of operation and in the presence of the metallic hydrogenation catalyst to form the corresponding paraffinic hydrocarbons. The combination solvent preferably contains from about 10 to about 50% by weight of the alcoholic component, that is, the methanol or ethanol portion of the mixed solvent. The alkyl nitroaromatic compound may be charged to the hydrogenation reactor dissolved in the specified solvent mixture in any concentration from a relatively dilute solution containing from about 0.1 part of the nitro compound per 100 parts of solution to relatively concentrated solutions of the charge stock in the solvent, up to about 50 parts per 100 parts by weight of solution.

The selective reduction of the nitro group of the alkyl nitroaromatic compound charged to the reaction of the present process is effected in the presence of a metallic hydrogenation catalyst, preferably distributed upon a refractory support, such as a porous metal oxide. Suitable metallic hydrogenation catalysts which effect the present reduction to the corresponding amino radicals are, for example, the iron group metals of the elements of group VIII of the periodic table, preferably the metals: nickel, cobalt, and particularly the noble metals of the group VIII elements: platinum and palladium. As indicated, these metals are preferably deposited upon a carrier therefor which provides an active catalytic surface exposed to the solution of the alkyl nitroaromatic compound reactant in the solvent and in the presence of gaseous hydrogen. Typical inert supports for the active catalytic metals are such materials as alumina, either as the naturally occurring bauxite or as a synthetically prepared dehydrated aluminum hydroxide, silica, porous carbon, such as wood charcoal, coal, coke, etc., naturally occurring porous mineralities, such as kieselguhr, Fullers Earth, Bentonite, and other natural clays and porous substances derived from mineral origin. The method for preparing such metallic hydrogenation catalysts is a well known procedure in this art, but, in general, the catalyst is either supplied to the hydrogenation zone in the form of a flocculent, fibrous, or other porous or fragmentary structure. The metallic catalyst may be composited with the support in any suitable manner, such as for example, by precipitating the metallic hydroxide on the supporting material and thereafter reducing the oxide to the metallic state. Supported catalysts for hydrogenation purposes generally contain from about 0.1 to about 50% by weight of the metallic component composited with or deposited on the supporting material.

Hydrogenation or reduction of the present alkyl nitroaromatic compounds utilized as charging stock herein is effected by passing the dissolved charging stock in the combination solvent herein provided over the catalyst or in contact therewith in the presence of hydrogen at a temperature of from about 30° to about 200° C. and at a pressure at least sufficient to maintain liquid phase in the hydrogenation zone, preferably at a superatmospheric pressure of from about 5 to about 100 atmospheres and for a period of contact of the charging stock with the catalyst of from about 10 minutes to about 2 hours. The contact of the reactants with the catalyst may be accomplished in either a batch-type reactor or by continuous means, for example, by flowing the liquid reactants containing the dissolved alkyl nitroaromatic compound over or through the catalyst in contact with the hydrogen until substantially complete reduction of the nitro group is effected. In general, the present catalytic operation wherein the charging stock is dissolved in the combination solvent is particularly adapted to a continuous type of operation, since the solvent herein provided produces a one-phase solution of the charging stock in the solvent capable of contacting the catalyst as a homogeneous mixture. The catalyst, for example, may be deposited upon an inert carrier and placed in a vertical tubular reactor through which the charging stock, dissolved in the present solvent and in contact with hydrogen at the desired temperature and pressure reaction conditions, is continuously forced through the bed of catalyst in either a downward or upward direction of flow and under conditions which provide a residence time in the tubular reactor and in contact with the catalyst sufficient to accomplish substantially complete reduction of the nitro group or groups on the alkyl nitroaromatic compound. The product stream issuing from the reactor may be charged directly into a distillation unit to recover the solvent components which may be recycled to the stage in the process flow in which the charging stock and solvent are mixed to provide the single phase solution charged into the hydrogenation reactor. Separation of the amine from unchanged charge is usually not possible by extraction with an aqueous acid phase, since the amine salts with relatively large alkyl groups of 8 carbon atoms or more are not soluble in water. Therefore, it is desirable to effect complete reduction of the charge stock in one pass through the reactor, since in this case the solvent and water of reaction may be removed by distillation, leaving as residue the amine product which is in a suitable condition and of sufficient purity for subsequent reactions involving the amine.

The present invention will be further illustrated with respect to specific embodiments thereof in the following examples which are intended merely to illustrate and not to limit the generally broad scope of the invention in strict accordance therewith.

A series of p-nitro alkylbenzenes in which the alkyl groups contain from 7 to 12 carbon atoms per alkyl group were mixed with various solvents to determine their solubility therein and for those solvents containing at least 5% of the alkyl nitrobenzene component, the resulting mixture together with hydrogen at 1000 pounds per square inch pressure was charged at a space velocity (volumes of liquid charging stock per volume of catalyst per hour) of from 0.1 to about 1.0, into the top of a vertical catalyst tube containing a hydrogenation catalyst consisting of 0.3% platinum deposited on alumina. The catalyst in the tubular reactor was maintained at an average temperature (an average of the temperature at the top, middle, and bottom of the tube) of from about 100° to about 200° C. For those solvents which fail to dissolve at least 5% by weight of the charging stock, the solvent was rejected as unsuitable for continuous hydrogenation at the hydrogenating conditions specified above. The following table presents the operating data utilized in the reduction, including the per cent conversion of the alkyl nitrobenzene charging stock to the corresponding amino substituted compound.

TABLE

*Conversion of alkyl nitroaromatic compounds to amines by hydrogenation in various solvents*

| Charging Stock | Solvent | Space Velocity | Temperature, °C. | Percent Nitro Compound Unconverted [1] |
|---|---|---|---|---|
| P-Nitrododecylbenzene | Hexane-Heptane | 0.20 | 107 | 13 |
| Do | do | 0.50 | 105 | 54 |
| Do | do | 0.20 | 228 | [2] 0.9 |
| Do | Methanol | | [3] | [3] |
| Do | Ethanol | | [3] | [3] |
| Do | Propanol | 0.20 | 150 | 87 |
| Do | Ethylacetate | 0.20 | 150 | 95 |
| Do | 10% Methanol-90% Hexane | 0.20 | 110 | 1.2 |
| Do | 40% Methanol-60% Hexane | 0.20 | 143 | 0.03 |
| Do | 40% Ethanol-60% Hexane | 0.20 | 143 | 6.2 |
| Do | 40% Methanol-60% Hexane | 0.23 | 125 | 0.3 |
| Do | do | 0.25 | 145 | 0.2 |
| p-Heptyldodecylbenzene | Methanol | | [3] | [3] |
| Do | Ethylacetate | | [3] | [3] |
| 3-Nitromethylnaphthalene | 40% Methanol-60% Hexane | 0.20 | 125 | 0.2 |

[1] The percent nitro compound remaining in the product as unconverted charging stock was determined by reduction with titanous chloride and back titration with ferric alum.
[2] The color of the product in this run was very dark and a considerable proportion of the charging stock was converted to a tarry residue separated from the reaction mixture by distillation.
[3] Rejected.

It is evident from the above results that either an alcohol alone of a hydrocarbon solvent alone is unsuitable for use as a solvent in the continuous reduction of an alkyl nitroaromatic compound to form the corresponding amine. Although a hydrocarbon solvent alone (hexane, e. g. with p-nitrododecylbenzene) dissolves the charging stock, the reduction converts only a portion of the alkyl nitroaromatic to amine, unless temperatures high enough to cause other undesirable reactions, such as deamination, are used. At the high temperatures, tarry materials are formed which cause the amine to be highly impure and unsuitable for subsequent reactions.

I claim as my invention:

1. In a process for selectively reducing the nitro group of an alkyl nitroaromatic compound to the corresponding amino-substituted alkyl-aromatic compound by contact of the first-named compound with a metallic hydrogenation catalyst in the presence of hydrogen and at hydrogenating conditions of temperature and pressure, the improvement which comprises passing over the catalyst a solution of said alkyl nitroaromatic compound in a mixture of a paraffinic hydrocarbon which is liquid at said conditions and an alcohol selected from the group consisting of methanol and ethanol.

2. The process of claim 1 further characterized in that said mixture contains from about 10 to about 50% by weight of said alcohol.

3. The process of claim 1 further characterized in that said paraffinic hydrocarbon is a $C_6$ paraffin.

4. The process of claim 1 further characterized in that said paraffinic hydrocarbon is a mixture of $C_6$ and $C_7$ paraffinic hydrocarbons.

5. The process of claim 1 further characterized in that said alkyl nitroaromatic compound is a mononuclear compound.

6. The process of claim 5 further characterized in that the alkyl group of said compound contains at least 7 carbon atoms.

7. The process of claim 1 further characterized in that said solution is passed over said hydrogenation catalyst at a temperature of from about 60° to about 250° C. and at a superatmospheric pressure.

8. In a process for the production of dodecylaniline by contacting dodecylnitrobenzene with a metallic hydrogenation catalyst in the presence of hydrogen and at hydrogenating conditions of temperature and pressure, the improvement which comprises passing over the catalyst a solution of said dodecylnitrobenzene in a mixture of a paraffinic hydrocarbon which is liquid at said conditions and an alcohol selected from the group consisting of methanol and ethanol.

9. The process of claim 8 further characterized in that said paraffinic hydrocarbon is a $C_6$ paraffin.

10. The process of claim 8 further characterized in that said temperature is from about 60° to about 250° C. and said pressure is superatmospheric.

11. The process of claim 8 further characterized in that said mixture contains from about 10 to about 50% by weight of said alcohol.

RALPH B. THOMPSON.

References Cited in the file of this patent

Werner: "Industrial and Eng. Chem.," vol. 40, #9 (1948), pp. 1576-9.